United States Patent [19]

Falk

[11] 4,028,913
[45] June 14, 1977

[54] CB RADIO LOCKING DEVICE

[75] Inventor: Sidney Falk, River Grove, Ill.

[73] Assignee: Fort Lock Corporation, River Grove, Ill.

[22] Filed: Aug. 13, 1976

[21] Appl. No.: 714,189

[52] U.S. Cl. .................................... 70/58; 70/258; 248/203
[51] Int. Cl.² ........................................ E05B 73/00
[58] Field of Search ................. 70/18, 57, 58, 258, 70/DIG. 57; 248/203

[56] References Cited
UNITED STATES PATENTS 3,673,828  7/1972  Jones ..................................... 70/58
3,766,759  10/1973  Artner .................................. 70/58

FOREIGN PATENTS OR APPLICATIONS 1,577,298  6/1969  France .................................. 70/58

Primary Examiner—Robert L. Wolfe
Attorney, Agent, or Firm—Leydig, Voit, Osann, Mayer & Holt, Ltd.

[57] ABSTRACT

A citizens band radio locking device for attachment to a stationary structure of vehicle which includes a frame structure which comprises a C-shaped bar member and a rectangular bar member transversely fixed to the C-shaped bar. The C-shaped bar carries a key actuated lock and a spindle which may be secured by the lock or removed therefrom bridges the opening between the ends of the C-shaped bar to confine and secure a CB radio within the frame structure.

3 Claims, 5 Drawing Figures

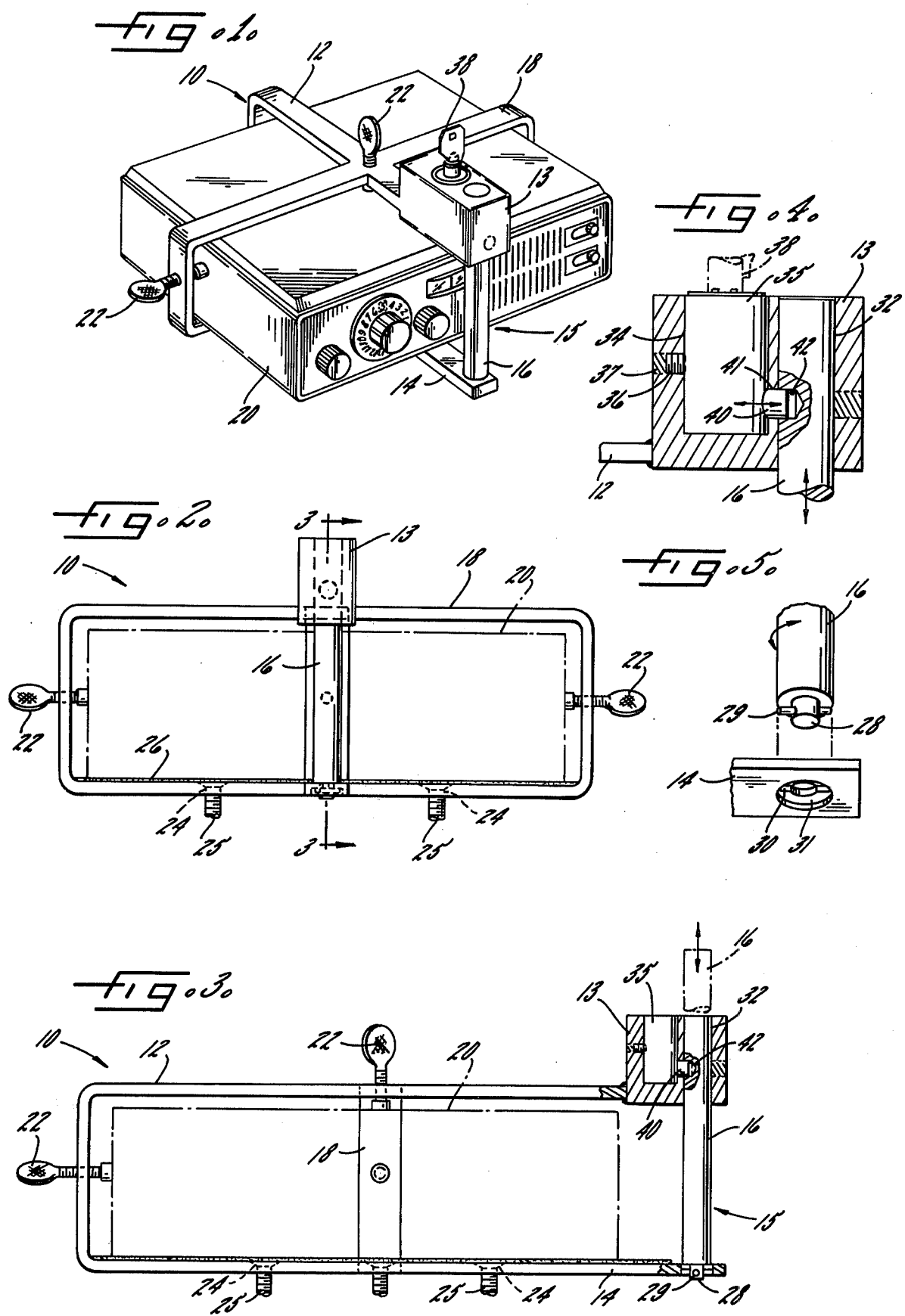

CB RADIO LOCKING DEVICE

DESCRIPTION OF THE INVENTION

The present invention relates generally to locking devices for radios and the like, and more particularly to a CB type radio locking device adapted to be fixably attached to a support such as an automobile dashboard and which provides a secure means for preventing the theft of a CB radio or the like from the vehicle.

SUMMARY OF THE INVENTION

The primary aim of the present invention is to provide a novel lockable frame arrangement for carrying a CB radio or the like which is extremely simple in construction, and easily mounted to a fixed structure in an automobile, yet permits securance against possible theft of the CB radio. Other objects and advantages of the invention will become apparent from the following detailed description taken in conjunction with the accompanying drawings.

BRIEF DESCRIPTION OF THE DRAWINGS

FIG. 1 is a perspective view of a radio locking device in accordance with the present invention illustrating the manner in which a radio is securely held by the device;

FIG. 2 is an enlarged front end view of the locking device of FIG. 1 with the radio removed and illustrating the manner in which the device may be mounted to a fixed support;

FIG. 3 is a side view of the locking device taken substantially along the lines 3—3 of FIG. 2;

FIG. 4 is a fragmentary enlarged cross sectional view of one side of the locking structure; and FIG. 5 is an exploded fragmentary perspective view of the other side of the locking structure of FIG. 3.

DESCRIPTION OF THE PREFERRED EMBODIMENT

As shown in the drawings for purposes of illustration and as viewed in FIG. 1, the invention is embodied in a generally rectangular frame, indicated at 10, which is adapted to be fixably secured to a stationary structure (not shown) such as an automobile dashboard or the like. The frame 10 as shown in FIG. 1 in its simplest form includes a C-shaped bar member 12 having a lock casing 13 adjacent one free end and the other free end 14 is spaced from the casing 13 to define an opening 15 which is bridged by a removable lock spindle 16. A generally rectangular bar member 18 extends transversely with respect to the C-shaped bar 12. The arrangement is such that with the lock spindle 16 removed, a citizen band radio 20 or the like may be inserted through the opening 15 into the frame structure 10 defined between the bars 12 and 18.

In order to more solidly hold the radio 10 captive within the frame, thumbscrews 22 pass through threaded openings provided at various locations on the frame bars 12, 18 and the inner ends of the threaded shanks of the thumbscrews have resilient caps to bear against the radio housing. It will be appreciated that the use of the thumbscrews permits a single size frame structure 10 to accommodate a number of different sized radio units.

For the purpose of mounting the frame structure 12 to a stationary structure, referring to FIGS. 2 and 3, suitable openings 24 may be provided in the bar members 12 and 18 to receive mounting bolts 25. The bolts 25 are inaccessible to tools for removal when the radio unit 20 is contained within the frame structure 10.

Additional cushioning or vibration isolating for the radio unit may be provided in the form of resilient strips 26 adhesively secured to the inside surfaces of the frame bars 12 and 18.

In carrying out the present invention, the spindle 16 is arranged to be inserted through the lock case 13 so as to bridge the opening 15 of the C-shaped bar member 12 and the spindle may then be securely locked in place to prevent removal of the radio unit 20. To this end, referring to FIGS. 3 and 5, conjointly, spindle 16 at its lower end as viewed in these figures, has a reduced diameter portion 28 and a pin 29 projecting transversely through the reduced portion 28. The end portion 14 of C-shaped bar 12 includes a slotted opening 30 corresponding in shape to the reduced portion 28 and pin 29 and a counterbore 31 which receives the pin 29 is recessed from the undersurface of end 14. The arrangement is such that the end portion 28 and pin 29 of spindle 16 may be inserted through the slotted opening 30 and then the spindle may be rotated thereby securing it with respect to the end portion 14.

The lock casing 13 has a vertical through passage 32 as viewed in FIGS. 3 and 4, which is axially aligned with the slotted opening 30 in end 14 so that the spindle 16 may be slid through the lock casing for attaching it to and detaching it from the end portion 14 as previously described. Disposed adjacent and parallel to the passage 32 is a cylinder bore 34 which receives a lock cylinder 35 that is secured to the casing 13 by a threaded set screw 36 and a fixed plug 37 prevents removal of the set screw and the lock cylinder.

In the present instance, the lock cylinder is provided with a maximum security axial pin tumbler type lock operated by a tubular key 38. For details of a lock of this type, reference may be made to Trainor U.S. Pat. No. 3,509,748, assigned to the assignee of the present application.

The key 38 operating the lock will extend and retract bolt 40 through an opening 41 between the cylinder passage 34 and the spindle passage 32. The spindle in turn has a radially extending bore 42 which receives the bolt 40. As viewed in FIG. 3, the bore 42 is angularly offset with respect to the axis of the pin 29 so that the spindle 16 must be rotated to secure its end carrying the pin to bar end 14 before the bolt 40 enters the bore 42 to complete the locking of the spindle in place.

The lock casing and the frame bars are fabricated from suitable high strength materials such as steel and the spindle as well as the other frame members may be hardened to resist cutting attempts.

From the foregoing it will be apparent that the novel CB radio lock provides a relatively simple and inexpensive structure with which to secure a radio from theft and it may be readily attached to a fixed structure such as in an automobile and yet renders the radio easily removable when desired by proper key operation of the lock.

I claim as my invention:

1. A locking device for attachment to a stationary structure of a vehicle for receiving and securing a CB radio and the like comprising, in combination, a frame structure including a C-shaped bar member having first and second free ends with a spaced opening therebetween, a rectangular bar member transversely fixed to said C-shaped bar, one free end of the C-shaped bar including a lock casing having a key actuated lock therein, means defining a transverse passage through said lock casing, a spindle adapted to pass through said lock case passage means and having coupling means at a first end, means disposed in said other free end of the C-shaped bar for receiving said spindle first end coupling means and locking bolt means operated by said key actuated cylinder for securing the spindle to said lock casing.

2. A radio locking device as claimed in claim 1 wherein said C-shaped bar member and said rectangular bar member carry thumbscrew means having resilient cups at their inner ends for securing said radio unit within the frame structure.

3. A radio locking device as claimed in claim 1 wherein said spindle coupling means comprises a reduced cylindrical portion having a transverse pin and said other C-shaped bar free end means is a slotted opening corresponding in shape to the spindle coupling means.

* * * * *